United States Patent Office 2,948,505
Patented Aug. 9, 1960

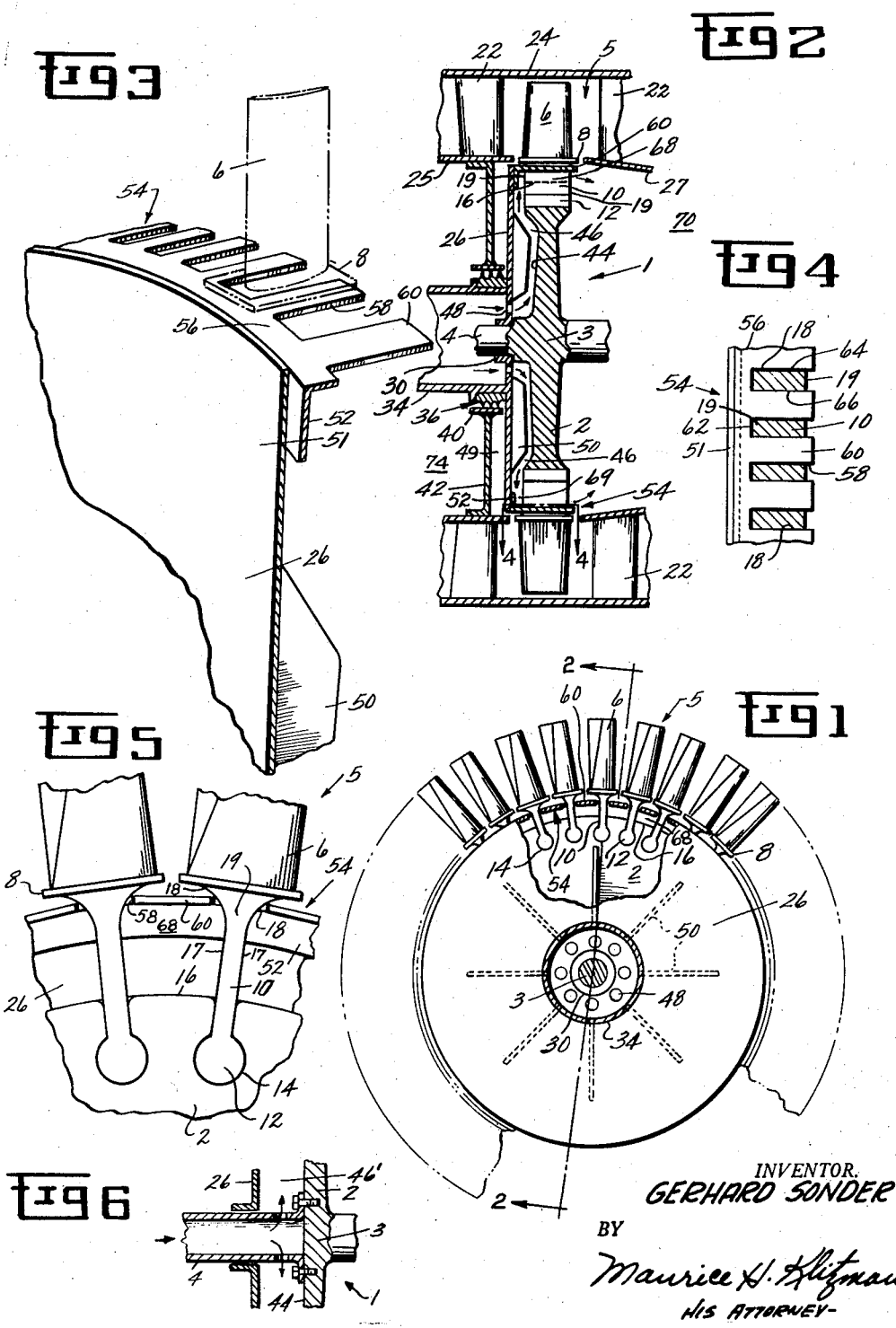

2,948,505

GAS TURBINE ROTOR

Gerhard Sonder, Cambridge, Mass., assignor to General Electric Company, a corporation of New York Filed Dec. 26, 1956, Ser. No. 630,612

3 Claims. (Cl. 253—39.15)

The present invention relates to turbine rotors, especially gas turbine rotors of the type used in turbo engines and operated by the flow of hot gases from the combustion chamber of the engine. More particularly, the invention relates to a device for cooling, and damping vibrations in, such gas turbine rotors.

The harmful stresses which exist in a turbine rotor disk due to radial temperature gradient therein can be reduced most effectively by cooling the disk and turbine blades in a manner which reduces the gradient to a minimum. One way of doing this is to contact the face of the disk with a flow of cooling fluid. However, a better way is to remove as much heat as possible at the root of the turbine blades before it has a chance to enter the disk and to provide a moving layer of cooling fluid between the hot fluid and the portions of the disk periphery which are ordinarily exposed to the hot fluid. It is important in any of these arrangements to prevent communication between the hot working fluid and the cooling fluid because any such communication results in the hot fluids being drawn into the cooling passages with unsatisfactory results. This is especially important when heat is removed from the blades by contacting the base portions thereof with cooling fluid and when a moving layer of cooling fluid is used between the normally exposed portions of the disk periphery and the hot fluid because the strong free-convection currents produced at the peripheral portions of the rotor, where the cooling fluid is performing its cooling function, by the centrifugal forces of the rotating rotor cause excessive amounts of hot working fluid to be drawn into the cooling passages. In prior art constructions utilizing a barrier between the hot working fluid and the cooling fluid, distortions resulting from the centrifugal forces on the rotor and high temperatures during turbine operation results in substantial leakage of the hot fluid into the cooling fluid and exposure of the disk periphery to the hot fluid.

An object of the present invention is to provide a hot fluid operated turbine rotor having a simple cooling arrangement which keeps the temperature gradient and hence thermal stresses in the rotor disk at a minimum and extends a maximum cooling effort near the source of the heat and at the peripheral portions of the rotor and providing an effective seal between the hot fluid and cooling fluid which is substantially unimpaired by centrifugal force and high temperatures. Consequently, the temperature gradients occur in parts well suited to sustain them.

Another object is to provide a hot fluid operated turbine rotor in which cooling fluid is directed between the blade shanks, in which vibration of the blades is effectively damped and in which the means for damping vibrations is urged into vibration damping relation with the blades by centrifugal force.

Yet another object is to provide a hot fluid operated turbine rotor employing a simple inexpensive device, which directs cooling fluid along a face of the blade shanks and into the spaces between the blade shanks into contact with the peripheries of the shanks, which seals the cooling fluid in the spaces from communication with the hot fluid, which provides a cooling fluid space between the hot fluid and the portions of the disk periphery ordinarily exposed to the hot fluid, which dampens vibrations of the blades, in which the sealing and damping effect is unimpaired by centrifugal force and increased temperatures and which is urged into sealing and damping relation with the shanks of the blades by centrifugal force.

These objects are effected in accordance with the present invention by providing blades with shanks extending beyond the disk periphery and an annular strip having fingers extending between the shanks of the blades and spaced from the periphery of the turbine disk, the spaces between adjacent fingers comprising notches each of which snugly receives a blade shank. Each shank has an outwardly flared outer portion, which extends radially outwardly from its adjacent fingers, between which the fingers are wedged and against which the fingers are urged by centrifugal force. The strip and fingers are unattached to the shanks. The fingers, shank peripheries and the periphery of the disk form passages through which cooling fluids are adapted to pass and which are effectively sealed from the hot working fluid. The snug arrangement of the shanks with the edges of the notches provides this sealing effect and at the same time damps the vibration of the shanks. Since the fingers overlie the portions of the periphery of the disk between the shanks the cooling fluid in the passages shields these portions from exposure to the hot fluid. Since the fingers are urged against the shanks by centrifugal force the sealing, damping and shielding effect is unimpaired by centrifugal force or high temperature. Preferably a plate is provided along the face of the face of the disk and the corresponding faces of the blade shanks. It is rotatable with the disk and spaced therefrom to form a space through which cooling fluid is adapted to flow and one wall of which comprises the disk face and corresponding faces of the blade shanks located radially inwardly of the strip. A peripheral portion of the plate cooperates with the strip to lock it in the position in which the shanks are snugly received in the notches as aforesaid and to provide substantially fluid tight communication between the space along the disk face and the passages. Preferably, the strip is not attached to the plate. The plate has a plurality of fins extending radially along the face thereof.

The construction of the present invention is especially suitable for use with small turbo engines of the type described in application Serial Number 548,987 filed by G. W. Lawson on November 25, 1955, and assigned to the same assignee as this application.

The above and other objects of the present invention are effected as set forth above and below as will be apparent from the following description and claims and the accompanying drawings, all of which describe and show by way of illustration only and without limitation what is now considered to be the preferred embodiment of the invention.

In the drawings:

Fig. 1 is a side view of the rotor of the present invention looking from the compressor side thereof with portions of the turbine side cover, cooling fluid plate and strip cut away to show some of the turbine blades, a part of the disk and some of the fingers.

Fig. 2 is a section taken along the line 2—2 of Fig. 1.

Fig. 3 is a view in perspective of a portion of the plate, strip and fingers and a single blade showing how the shank thereof is received in a notch of the strip.

Fig. 4 is a section taken along the line 4—4 of Fig. 2.

Fig. 5 is a fragmentary end view of the rotor of Fig. 1, on an enlarged scale.

Fig. 6 is a fragmentary view showing a modified embodiment.

Referring to the figures, 1 is a turbine rotor of a small turbo engine of the type described in U.S. Patent No. 2,912,823 to Gerald W. Lawson, entitled Gas Turbine Engine, issued November 17, 1959 and assigned to the same assignee as this application. The rotor comprises a turbine disk 2, which is connected by means of a thickened hub portion 3 with the turbine shaft 4 for driving the compressor of the engine (not shown), and a plurality of turbine blades 5 each of which comprises a working bucket portion 6, a platform 8, a shank 10 and a dovetail shaped root or fastening portion 12 which is received in a dovetail slot 14 in the peripheral portion of the disk 2. The dovetail fastening portion 12 is locked in the slot 14 by conventional means, not shown.

The shank 10 of each turbine blade extends a substantial distance radially inwardly of the periphery 16 of the disk. The two opposite sides of shank 10, which extend beyond the periphery, are spaced closely to each other to form a relatively narrow shank portion 17 along most of the exposed shank length and then flare outwardly at 18, as shown in Fig. 5. The outwardly flared portions 18 extend into the platform 8. The other ends of the sides 17 of the shank extend into the dovetail contour of the fastening portion 12. The other opposite sides or faces 19 of the shank portion 10 and the fastening portion 12 are shown straight and parallel, the thickness therebetween being approximately the same throughout the length thereof and approximately the same as the thickness of the disk, as shown in Fig. 2. However, it is recognized that the faces 19 could be tapered.

The turbine blades 5 rotate between the turbine stators or diaphragm partitions 22 which are fixed to and between the outer stator shroud or diaphragm 24 and the inner stator shrouds or diaphragms 25 and 27. The shrouds define a passage 20 for conducting hot motive fluid through blades 5.

A cooling fluid plate 26 is mounted on the shaft 3. Extending axially from the plate 26 is a hollow hub portion 34 upon which is mounted a labyrinth seal 36. Another hub portion 40 cooperates with the labyrinth seal 36 to form a seal for the plenum chamber 49. The hub portion 40 is formed on the diaphragm 42, the periphery of which is fastened in any well known manner to the inner portion of the inner shroud 25. The inner surface of the plate 26 is spaced from the face 44 of the disk 2 and the corresponding faces or sides 19 of the blade shanks to provide a cooling fluid space 46 between the plate 26 and the disk face 44 and between the plate 26 and the corresponding faces or sides 19 of the blades 10. The plate 26 has a plurality of holes 48 located radially inwardly of the hollow hub 34 and arranged in a circle, through which compressed air from a conventional engine compressor (not shown) connected in fluid flow relation with hollow hub portion 34, flows from the hollow hub portion into the chamber 46. The face of plate 26 facing the disk face 44 is provided with a plurality of fins 50 extending in a radial direction. The fins can also extend in other directions.

The peripheral portion 51 of the plate 26 overlies and abuts against the annular leg 52 of an L-shaped annular strip 54. The leg 52 extends substantially radially outwardly and terminates with an annular portion 56 which is spaced radially outwardly from the periphery 16 of disk 2. The annular portion 56 has a plurality of notches 58 therein which form a plurality of fingers 60 spaced from the periphery 16. Each notch 58 snugly receives a shank 10 of a blade 5 and the fingers 60 extend into the spaces between adjacent shanks. Referring to Fig. 4, the edges or walls 64 and 66 of each notch 58 and of adjacent fingers 60 snugly engage the flared-out sides 18 of the shank 10, which is received in the notch and between the adjacent fingers 60, and the base wall 62 of the notch snugly engages the side or face 19 of the shank so that in effect each finger 60 is wedged between the flared out sides 18 of adjacent shanks. This construction enables the fingers 60 to act as vibration dampers. Strip 54 is not attached to either the shanks 10 or the plate 26. The distance of plate 26 from the face 44 of disk 2 and the dimensions of the strip 54 and the notches 58 are selected so that the engagement of the peripheral portion 51 of plate 26 with portion 52 as shown in the figures, locks the strip 54 in the position shown with the base walls 62 of the notches 58 pressed snugly against the sides or faces 19 of the shanks and the fingers 60 wedged between the sides 18 of adjacent shanks.

Since the fingers 60 are spaced radially from the periphery 16 of the disk 2, a plurality of cooling fluid passages 68 are formed by the sides 17 of adjacent shanks, the portion of the periphery 16 between the adjacent shanks and the fingers 60 extending between the adjacent shanks. These cooling fluid passages 68 communicate with the cooling space 46 between plate 26 and the face 44 of disk 2 through cooling fluid space 69 between the faces or sides 19 of the shanks 10 and the inside faces of leg portion 52 and the peripheral portion 51 of plate 26. The cooling fluid, compressed air in this embodiment, passes from hollow hub portion 34 through holes 48 into space 46. It flows in a radial direction through spaces 46 and 69 along the face 44 of disk 2 and the faces 19 of shanks 10, and is then directed by fingers 60 of strip 54 at right angles into and through the passages 68 against the sides 17 of the shanks forming the walls of such passages, and thence into space 70. Thus a moving layer of cooling fluid lies between the hot fluid in passage 20 and the rotor disk 2, and heat is removed from the shanks 10 before it can pass into the disk 2.

The snug fit between the edges 64, 66 and 62 of each notch and the opposite flared-out sides 18 and one side 19 of the shanks provides an effective seal between passages 68 containing the cooling fluid and the space containing the hot working fluid into which the bucket portions 6 extend. The snug fit between the peripheral portion 51 and the annular leg portion 52 of strip 54 also forms an effective seal between the cooling passages 69 and 68 and the hot working fluid leaking into the space 49 between plate 26 and stationary plate 42. The labyrinth seal 36 and hub portion 40 provide a seal sealing off space 49 from the space 74. Consequently, the cooling fluid is sealed from the hot fluid along its entire route from hollow hub portion 34 through apertures 48, spaces 46 and passages 68 and 69.

The snug fit between the edges 64, 66 and 62 of the notches and the two flared-out sides 18 and one side 19 of the shanks 10 also damps the vibrations of the shanks and hence of the blades.

Although it is highly desirable in order to obtain a maximum sealing and damping effect to have the base wall 62 of all of the notches pressed snugly against the faces or sides 19 of all the shanks, and although it is stated above that the fit between the base wall 62 and sides 19 of the shanks is a snug one, in many cases the faces or sides 19 of all of the blades do not fall exactly in the same plane because of tolerances in rotor construction. Consequently, there may be slight spaces between the base walls 62 of some of the notches and the faces 19 of the shanks received in these notches. However, any leakage which might occur through these slight spaces is small and does not have any substantial adverse effect.

The centrifugal force of the rotor during rotation thereof urges the edges 64 and 66 of the fingers into sealing and vibration damping engagement with the flared out sides 18 of the shanks to thereby assure excellent sealing and vibration damping at high speeds. Centrifugal force and high temperatures cause the shanks to stretch and expand radially outwardly which causes the widened portions 18 of the shanks as well as the platforms 8 to move radially outwardly and the spaces between the platforms of adjacent blades to thereby widen. As a consequence of the expansions, it is unsatisfactory to use abutting adjacent platforms for sealing and damping purposes. However, the metallic fingers of the present invention are also moved radially outwardly by the centrifugal force to thereby maintain a tight fit between the sides 18 of the shanks and the edges 64 and 66 of the fingers and consequently compensate for the radial stretch of the shanks. The fingers are urged radially outwardly against the sides 18 of the shanks by centrifugal force because the strip 54 is neither attached to the plate 26 nor the shanks 10, and is made of a material having a certain degree of flexibility, such as steel or other heat resisting materials, and has a relatively small thickness. Consequently, the fingers 60 of strip 54 are free to move and flex in a radial direction into engagement with sides 18. In fact, the centrifugal force causes the fingers to move radially outwardly even further than the shanks are stretched so that the fingers are wedged even more tightly against the outwardly flared portions 18. It is apparent that the distortion of the shanks and the strip 54 by centrifugal force does not cause the sides 19 of the shanks and the edges 62 of the notches to move away from each other since they are not spaced circumferentially from each other.

The plate 26 acts as an effective radiation shield and since it carries no rim load it can withstand the relatively high thermal stresses which may be imposed on it by this shielding action.

The centrifugal force of the motor causes the cooling fluid to pass radially along the face 44 of the disk and the fins 50 serve to keep it flowing at prevailing rotor speed, at which the heat transfer coefficient along the disk face is at a low value. As the cooling air passes between the bucket shanks through passages 68, the large centrifugal forces generate strong free-convection currents therein which produce very large heat transfer rates between the hot bucket shanks and the coolant. Thus, the bucket shanks, which represent a low resistance to heat transfer due to their relatively small cross-section, are cooled very effectively and have a large temperature gradient. Only a small amount of heat enters the disk, which will, therefore, sustain only a small temperature gradient.

Thus, in accordance with the present invention the maximum cooling effort is expended near the source of the heat, the temperature gradients occur in parts well suited to sustain them since the temperature gradient and resultant stresses in the turbine disk are kept at a minimum and the temperature gradient in the blade is kept at a maximum, the optimum use is made of the inherently available factors to produce large heat transfer coefficients where they are most needed, the coolant is effectively sealed off from the hot fluid during rotor operation, vibrations of the blades is damped and the sealing and vibration damping effect is not impaired by centrifugal forces. In fact, it is increased thereby.

The cooling and damping apparatus of the present invention is inexpensive and simple, being made up essentially of only two pieces 26 and 54. It is extremely durable and long lasting because even though the edges 64 and 66 of the notches 58 and the walls 18 of the shanks become worn they are still forced into effective sealing and vibration damping engagement with each other by the centrifugal forces of the rotor.

Referring now to Fig. 6, the rotating, driving shaft 4 between the compressor and turbine rotor may be made hollow and the compressed air from the compressor supplied to the space 46' through openings 75 formed in the hollow shaft. Space 46', which in the remaining figures, is simply a plenum chamber, may then become part of the hollow, rotating compressor drive shaft, as shown in Fig. 6.

What I claim as new and desire to secure by Letters Patent of the United States is:

1. In a turbine, a turbine rotor comprising a turbine disk having a plurality of turbine blades located circumferentially around the periphery thereof, each of said blades comprising a bucket portion, a radially extending shank and a root portion, said root portions being attached to said disk with said shanks extending beyond the periphery of said disk in circumferentially spaced relation, an annular strip, and a plurality of resilient fingers attached at one end thereof to said strip and extending axially therefrom, the other end of said fingers being unsupported so as to be free to move radially; each of said fingers being spaced radially outward from the periphery of said disk and extending into the spaces between adjacent shanks, each of said shanks having a portion flared-out circumferentially and extending radially outwardly from adjacent fingers, each of said fingers engaging and wedged between said flared-out portions of ones of said shanks adjacent thereto, said fingers being urged into sealing engagement with said flared-out portions by centrifugal force when said rotor is rotated, whereby said fingers resiliently oppose vibration of said blades, said strip being supported in concentric relation to said rotor by said engagement of said fingers and said shanks; said fingers, said shanks, and the periphery of said disk forming axially extending cooling fluid passages through said rotor.

2. In a turbine, a turbine rotor comprising a turbine disk having a plurality of turbine blades located circumferentially around the periphery thereof, each of said blades comprising a bucket portion, a radially extending shank and a root portion, said root portions being attached to said disk with said shanks extending beyond the periphery of said disk in circumferentially spaced relation, a plate secured to said rotor so as to be rotatable therewith and extending adjacent and in spaced relationship to a face of said rotor to form a cooling fluid passage therewith, an annular strip extending axially toward said plate near the outer periphery thereof, and a plurality of resilient fingers attached at one end thereof to said strip and extending axially therefrom, the other end of said fingers being unsupported so as to be free to move radially; each of said fingers being spaced radially outwardly from the periphery of said disk and extending into the spaces between adjacent shanks, each of said shanks having a portion flared-out circumferentially and extending radially outwardly from adjacent fingers, each of said fingers engaging and wedged between said flared-out portions of ones of said shanks adjacent thereto, said fingers being urged into sealing engagement with said flared-out portions by centrifugal force when said rotor is rotated, whereby said fingers resiliently oppose vibration of said blades, said strip being supported in concentric relation to said rotor by said engagement of said fingers and said shanks, said fingers, said shanks, and the periphery of said disk forming cooling fluid passages extending axially through said rotor and in fluid communication with the cooling fluid passage between said plate and said disk.

3. In a turbine operated by hot fluids, a turbine rotor comprising a turbine disk having a plurality of turbine blades located circumferentially around the periphery thereof, each of said blades comprising a bucket portion, a radially extending shank and a root portion, said root portion being attached to said disk with said shanks extending beyond the periphery of said disk in circumferentially spaced relation, a plate secured to said rotor so as to be rotatable therewith and extending adjacent and in axially spaced relationship to a face of said rotor to form a cooling fluid passage therewith, a hollow hub portion forming a cooling fluid passage extending around and along the axis of said rotor and in fluid communication with the cooling fluid passage formed between said plate and said disk, radially extending fins attached to said plate adjacent said disk face, said fins directing cooling fluid radially outward from said hollow hub portion along said disk face, an annular strip extending axially toward said plate near the outer periphery thereof, and a plurality of resilient fingers attached at one end thereof to said strip and extending axially therefrom; each of said fingers being spaced radially outward from the periphery of said disk and extending into the spaces between adjacent shanks in engagement with said shanks, whereby said fingers resiliently oppose vibration of said blades, said strip being supported in concentric relation to said rotor by said engagement of said fingers and said shanks; each of said shanks having a portion flared-out circumferentially and extending radially outwardly from adjacent fingers, whereby said fingers are urged into sealing engagement with said flared-out portions by centrifugal force when said rotor is rotated; said fingers and shanks and the periphery of said disk forming cooling fluid passages extending axially through said rotor in fluid communication with the cooling fluid passage between said plate and said disk.

References Cited in the file of this patent

UNITED STATES PATENTS

| | | |
|---|---|---|
| 2,568,726 | Franz | Sept. 25, 1951 |
| 2,603,453 | Sollinger | July 15, 1952 |
| 2,623,727 | McLeod | Dec. 30, 1952 |
| 2,672,013 | Lundquist | Mar. 16, 1954 |

FOREIGN PATENTS

| | | |
|---|---|---|
| 670,665 | Great Britain | Apr. 23, 1952 |
| 687,507 | Great Britain | Feb. 18, 1953 |
| 701,263 | Great Britain | Dec. 23, 1953 |